May 30, 1950        A. P. HART        2,509,598
TENSION RELEASED COUPLING
Filed May 10, 1949
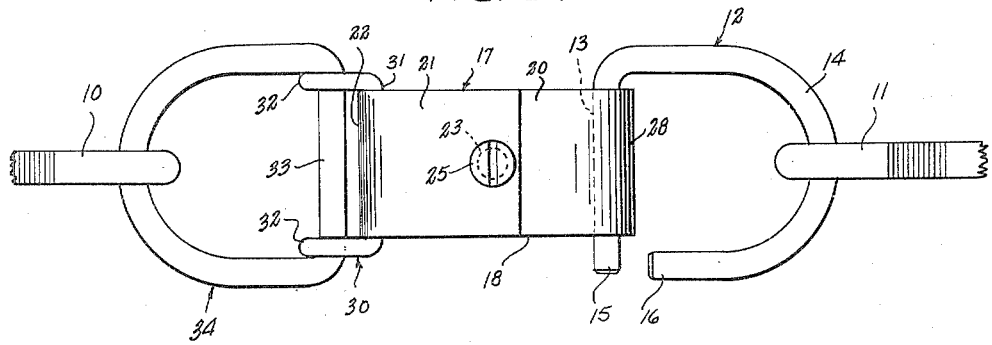
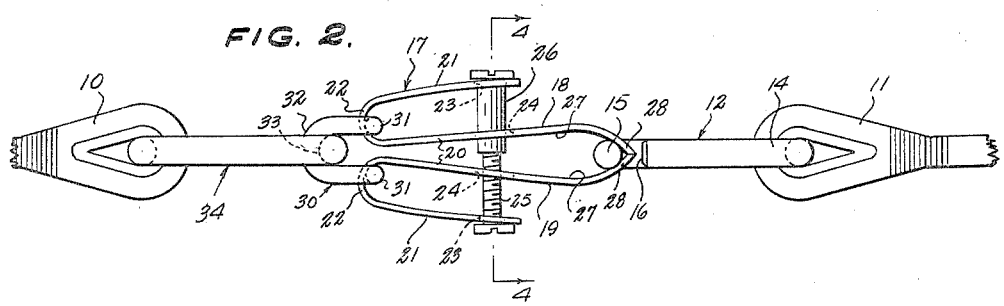
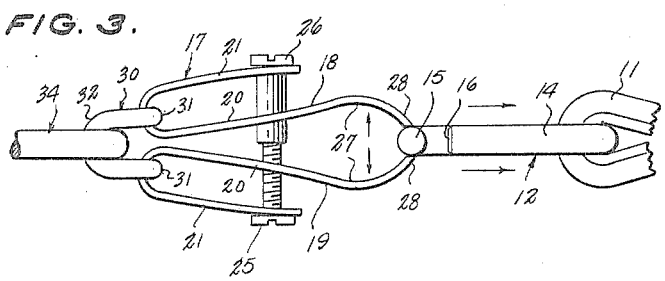
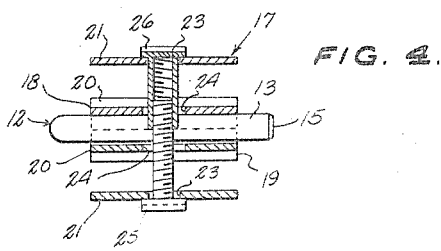
INVENTOR.
ANDREW P. HART,
BY
McMorrow, Berman & Davidson
ATTORNEYS.

Patented May 30, 1950

2,509,598

UNITED STATES PATENT OFFICE 2,509,598

TENSION-RELEASED COUPLING

Andrew P. Hart, Jasper, Tex.

Application May 10, 1949, Serial No. 92,260

4 Claims. (Cl. 24—201)

It is frequently desirable to so connect together the meeting edges of a pair of flexible members providing a flexible barrier that they are released upon the application of sufficient tension or pressure to the barrier. For instance, such barriers might be used as panic barriers to restrain a crowd and/or to restrain a horse and rider in a rodeo contest. Obviously, many other uses of such a coupling will occur to those skilled in the art.

With the foregoing in view, it is an object of my invention to provide an improved tension-released coupling of the class described.

A further object is to provide an improved tension-released coupling which includes a pair of opposed spring members having opposed portions formed to provide an eye and adapted to receive a hook therebetween, said hook being freely inserted in and removed from said eye and also being forcibly removed from said eye from between the abutting front ends of said members.

A further object is to provide in a coupling such as that last described means connecting the eye-providing members together, said connecting means being a rigid member and means for adjusting the connection whereby the tension of the spring members may be varied to selected degrees.

Other objects and advantages reside in the particular structure of the invention, the structure of the several elements thereof, combinations and sub-combinations of such elements, all of which will be readily apparent to those skilled in the art upon reference to the attached drawing in connection with the following specification, wherein the invention is shown, described and claimed.

In the drawing:

Figure 1 is an elevational view showing the device of the invention;

Figure 2 is a bottom plan view thereof;

Figure 3 is a view like Figure 2, but showing the parts in a different position;

Figure 4 is a transverse vertical sectional view taken substantially on the plane of the line 4—4 of Figure 2.

Referring specifically to the drawing, wherein like reference characters have been used throughout the several views to designate like parts, 10 and 11 designate generally the meeting edges of any suitable flexible barrier-providing sections, such as ropes or cables. In the embodiment illustrated, the ends or edges 10 and 11 comprise eyes. The eye 11 has detachably secured thereto any suitable hook 12. The hook 12 is substantially D-shaped and comprises a leg 13 and a loop 14 integrally connected to the upper end of the leg. The lower end 15 of the leg and the adjacent end 16 of the loop are spaced apart to provide means for readily attaching the hook 12 to the eye 11 and to a coupling eye to be described hereinafter.

The coupling eye is generally indicated at 17 and comprises a pair of substantially identical J-shaped leaf springs 18 and 19. Each of the springs 18 and 19 includes a short leg 21 and a long leg 20. The springs 18 and 19 are disposed in back-to-back relation with the long legs 20 juxtaposed between the short legs 21. The short legs 21 and long legs 20 are connected together by bights 22 which are rearwardly directed relative to the coupling. The short legs 21 are provided with aligned apertures 23 adjacent the free ends thereof and the long legs 20 are provided with aligned apertures 24 intermediate the ends thereof and in alignment with the apertures 23. A threaded bolt 25 is freely insertable through the aligned apertures 23 and 24 and threadedly engaged with a tubular sleeve nut 26, whereby to connect the springs 18 and 19 together. As best seen in Figures 2 and 3, the long legs 20 of the springs 18 and 19 have facing surfaces which are outwardly concaved, as at 27, to provide a coupling eye portion forwardly of the bolt 25. Also, the front ends of the legs 20 are inwardly directed, as at 28, into abutting relation. The arrangement of parts is such that the clamping of the bolt 25 and nut 26 is limited to their engagement with the outer surfaces of the short legs 21. Such engagement causes a resilient engagement of the front ends 28 of the long legs 20 which resists withdrawal of the leg 13 of hook 12 in a forward direction between the front ends 28, as shown in Figure 3. However, if sufficient tension is applied to the coupling, the front ends 28 of the long legs 20 will be spread apart, as shown in Figure 3, to break the barrier. At the same time, it is apparent that relative movement of the coupling eye 17 and hook 12 axially of the leg 13 of the hook permits ready engagement and disengagement of the hook and coupling eye.

The coupling eye may be connected to the meeting edge 10 of the left-hand barrier in any suitable manner. However, as shown, a one-piece link 30 is provided with a pair of forwardly-directed bights 31 engaging the bights 22 of the springs 18 and 19 and a pair of rear-widely-directed and right-angularly-disposed bights 32 which engage the leg 33 of a D-ring 34.

The D-ring 34 is looped through the eye 10 to provide a more or less permanent joint with such eye. However, it is apparent that removal of the bolt 25 permits the springs 18 and 19 to be disengaged from the bights 31 of the link 30, whereby the link 30 is readily disengaged from the D-ring 34.

While I have shown and described what is now thought to be a preferred form of the invention, it is to be understood that the same is susceptible of other embodiments and expressions. Consequently, I do not limit myself to the precise structure shown and described hereinabove except as hereinafter claimed.

I claim:

1. A tension-released coupling for the meeting edges of a pair of flexible barrier-providing sections, comprising a hook carried by the meeting edge of one of said sections, an eye carried by the meeting edge of the other of said sections, said hook being freely inserted in and removed from said eye for normal coupling and uncoupling of said sections, said eye comprising a pair of substantially identical J-shaped spring members of resilient material, said members comprising outer short legs and inner long legs connected by rearwardly-disposed bights, said members being arranged with said long legs juxtaposed between said short legs, said long legs having oppositely-concaved opposed surfaces and abutting front ends providing said eye, rigid connecting means connecting said members together rearwardly of said front edges thereof, said connecting means tensioning said long legs so as to cause said front edges thereof to resist withdrawal of said hook forwardly from said eye between said abutting front ends thereof, and means for connecting said bights to the meeting edge of the second-named barrier-providing section.

2. A tension-released coupling for the meeting edges of a pair of flexible barrier-providing sections, comprising a hook carried by the meeting edge of one of said sections, an eye carried by the meeting edge of the other of said sections, said hook being freely inserted in and removed from said eye for normal coupling and uncoupling of said sections, said eye comprising a pair of substantially identical J-shaped spring members of resilient material, said members comprising outer short legs and inner long legs connected by rearwardly-disposed bights, said members being arranged with said long legs juxtaposed between said short legs, said long legs having oppositely-concaved opposed surfaces and abutting front ends providing said eye, said short and long legs being formed with aligned apertures therethrough, a bolt freely passing through said apertures, said bolt having a head on one end and a nut on the other end, said head and nut engaging said short legs to connect said members together rearwardly of said front edges thereof, said nut-and-bolt adjustably tensioning said spring members so as to cause said front ends of said long legs to resist withdrawal of said hook forwardly from said eye between said abutting front ends thereof, and means for connecting said bights to the meeting edge of the second-named barrier-providing section.

3. A tension released coupling for the meeting edges of a pair of flexible barrier providing sections comprising a hook carried by the meeting edge of one of said sections, an eye carried by the meeting edge of the other of said sections, said hook being freely inserted in and removed from said eye for normal coupling and uncoupling of said sections, said eye comprising a pair of resilient members each embodying opposed legs interconnected by a bight, said members being disposed in side by side spaced relation with respect to each other, the free end of each of the innermost legs of said members being inwardly directed into abutting engagement with respect to the other to thereby form said eye, and adjustable tensioning means extending transversely through the legs of said members and operatively connected to the outermost legs thereof to adjust the tensioning on said abutting ends of the legs of said resilient members.

4. A tension released coupling for the meeting edges of a pair of flexible barrier providing sections comprising a hook carried by the meeting edge of one of said sections, an eye carried by the meeting edge of the other of said sections, said hook being freely inserted in and removed from said eye for normal coupling and uncoupling of said sections, said eye comprising a pair of resilient members each embodying opposed legs interconnected by a bight, said members being disposed in side by side spaced relation with respect to each other, the free end of each of the innermost legs of said members being inwardly directed into abutting engagement with respect to the other to thereby form said eye, and adjustable tensioning means extending transversely through the legs of said members and operatively connected to the outermost legs thereof to adjust the tensioning on said abutting ends of the legs of said resilient members, said means comprising a tubular sleeve nut extending through the legs of one of said members, and a bolt extending through the legs of the other of said members and threadedly engageable within said tubular sleeve nut.

ANDREW P. HART.

REFERENCES CITED

The following references are of record in the file of this patent:

UNITED STATES PATENTS

| Number | Name | Date |
| --- | --- | --- |
| 256,755 | Spangler | Apr. 18, 1882 |
| 1,394,793 | Rutten | Oct. 25, 1921 |
| 2,370,232 | Creekbaum | Feb. 27, 1945 |